United States Patent [19]

Cornelius

[11] 4,406,408
[45] Sep. 27, 1983

[54] WATER MOTOR FOR AN IRRIGATION SYSTEM

[76] Inventor: Gail Cornelius, 19060 N.W. Dorena, Portland, Oreg. 97229

[21] Appl. No.: 270,349

[22] Filed: Jun. 4, 1981

[51] Int. Cl.³ ......................... A01G 25/02; B05B 3/06
[52] U.S. Cl. .................................... 239/721; 239/258; 239/261
[58] Field of Search ............... 239/191, 192, 251, 258, 239/259, 261, 709–721, 177

[56] References Cited

U.S. PATENT DOCUMENTS

| | | | |
|---|---|---|---|
| 423,778 | 3/1890 | Kent | 239/259 |
| 3,314,608 | 4/1967 | Curtis et al. | 239/177 |
| 3,687,373 | 8/1972 | Cornelius | 239/191 |
| 3,704,827 | 12/1972 | Moulton | 239/177 |
| 3,795,365 | 3/1974 | Cornelius | 239/251 X |
| 3,957,204 | 5/1976 | Farris et al. | 239/177 |

Primary Examiner—Andres Kashnikow
Attorney, Agent, or Firm—Phillips, Moore, Lempio & Finley

[57] ABSTRACT

A water motor for an irrigation system includes a sleeve which can be replaced should it become worn due to abrasion of contaminants found in the irrigation water.

11 Claims, 3 Drawing Figures

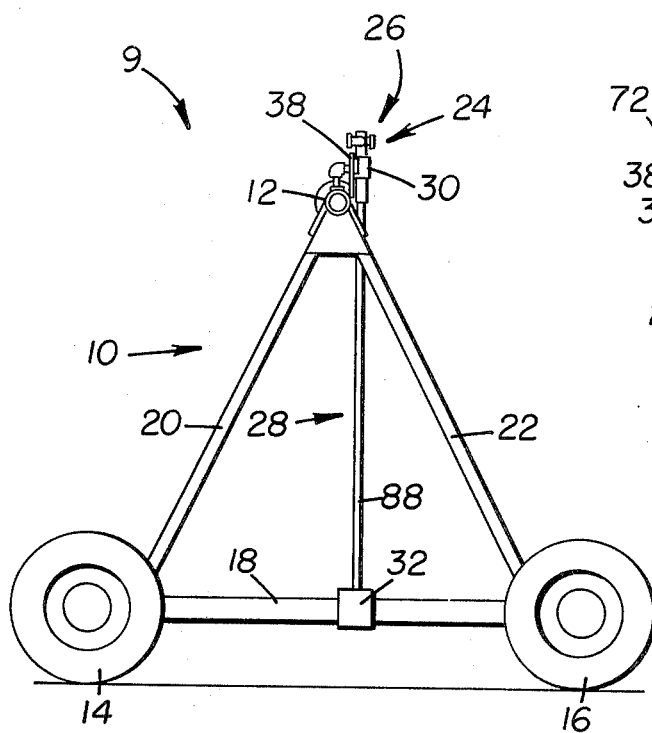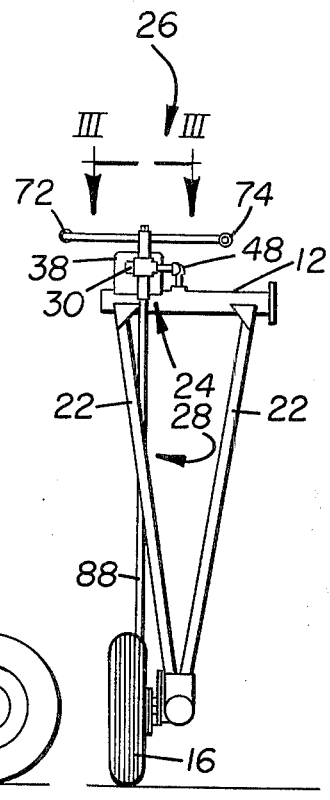
FIGURE 1
FIGURE 2

WATER MOTOR FOR AN IRRIGATION SYSTEM

TECHNICAL FIELD

This invention relates to irrigation systems, and in particular to an irrigation system including an irrigation line supported by wheels which can be driven by a water motor.

BACKGROUND ART

Prior art irrigation systems which include an irrigation line supported by tower assemblies having ground-engaging wheels can be pivoted about a central water supplying tower through the use of water motors associated with each tower assembly, which water motors drive the wheels. Such an arrangement has been found to be highly efficient and effective in driving or pivoting the irrigation line about the source in that the water which is pumped through the irrigation line to irrigate the field can also be used to drive the water motor. This eliminates the need, for example, to have separate electric motors and the appropriate conduits to drive the tower assemblies.

While the prior art water motors work satisfactorily, it has been found that certain areas are prone to wear and abrading due to sand, and other contaminants which are naturally present in the irrigation water. It has been found that such wear is most prominent on metal surfaces which come in contact with rubber or elastomeric seals and O-rings and the like. When such wear and abrading occurs, the water motor must be replaced in its entirety. Accordingly, there exists a need to provide a water motor which overcomes this abrading problem, which water motor is set forth below.

SUMMARY OF THE INVENTION

In one aspect of this invention, a water motor comprises a housing defining a first passage and first and second ports, the housing being adapted to connect with a source of water, and a replaceable sleeve defining a second passage, said sleeve disposed in said first passage and having at least one aperture providing communication between said first passage and said second passage. Said sleeve has a first end located adjacent said first port and a second end located adjacent said second port, which second end communicates with said second passage. The water motor further includes a shaft and means for fitting said shaft to said first end, jet means for dispensing water from said water motor to cause said shaft to revolve, means for fitting said water jet means to said second end so that said water jet means communicates with said second passage, and means to removably secure said water means to said shaft.

The water jet means can be easily removed to allow removal of the sleeve, should said sleeve become worn or abraded. Accordingly, the need to completely replace the water motor is eliminated and the system has a relatively short down time.

In yet another aspect of the invention, the water motor includes a first seal located adjacent said first port and disposed between said sleeve and said housing and a second seal located adjacent said second port and disposed between said sleeve and said housing.

In another aspect of the invention, an irrigation system includes an irrigation line, at least one tower assembly having at least one ground-engaging wheel, and a water motor. The water motor comprises a housing defining a first passage, said housing adapted to connect with a source of water, a shaft assembly including a replaceable sleeve, which replaceable sleeve is positioned in said first passage, said sleeve having a second passage and at least one aperture providing communication between said first passage and said second passage. The water motor further includes jet means for dispensing water from said water motor to turn said shaft assembly, and means for removably securing said water jet means to said shaft assembly so that said second passage communicates with said water jet means and so that said water jet means can be easily removed to replace said sleeve.

BRIEF DESCRIPTION OF THE DRAWINGS

FIG. 1 is a front view of a tower assembly of an irrigation line including an embodiment of the water motor of the invention.

FIG. 2 is a side view of the tower assembly of FIG. 1.

DETAILED DESCRIPTION OF THE PREFERRED EMBODIMENT

Figure 3:
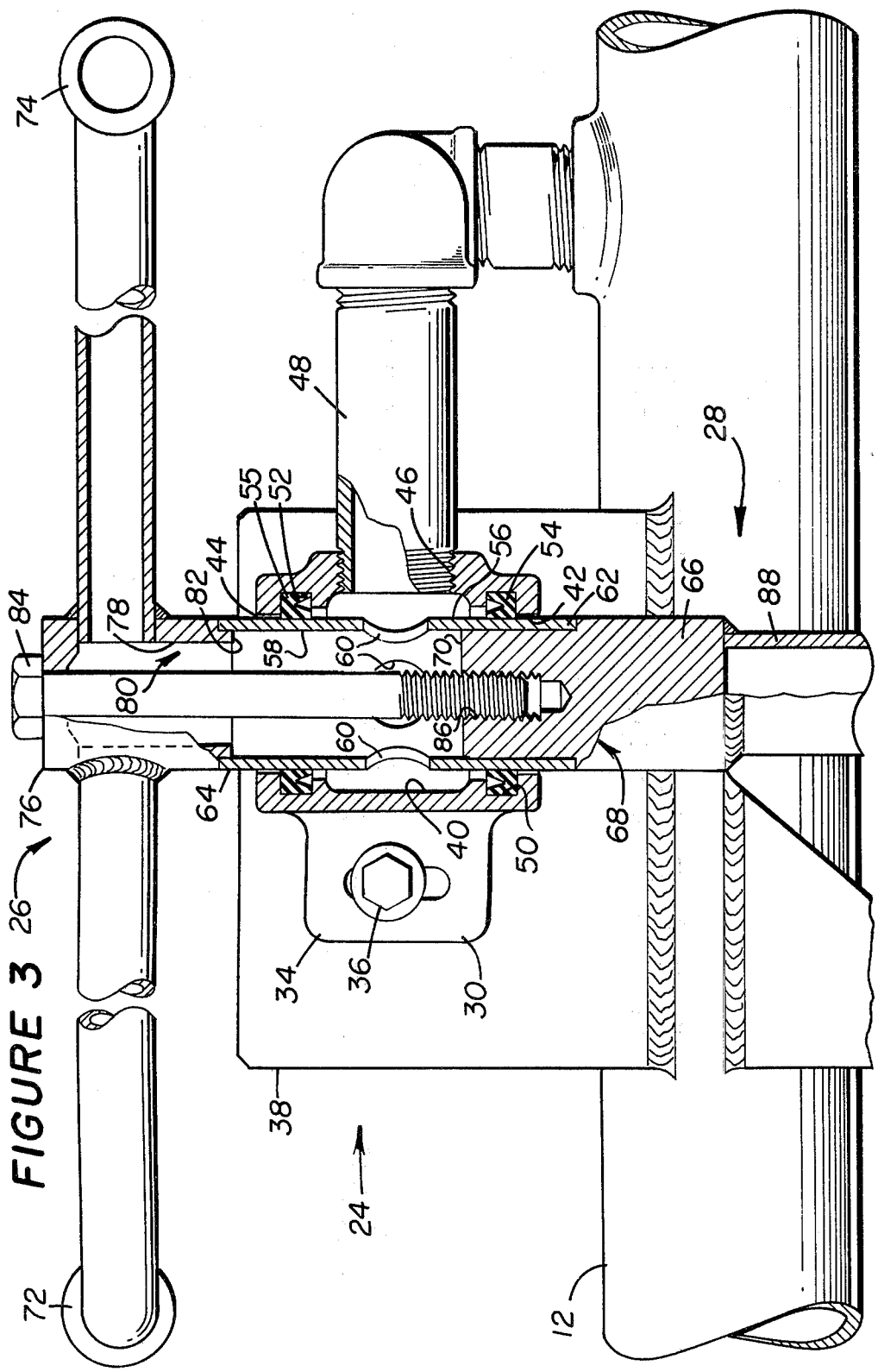
FIG. 3 is a partial cross-sectional view of the embodiment of the water motor of FIG. 1.

Depicted in FIGS. 1 and 2 is an irrigation system 9 which includes a tower assembly 10, which is one of a plurality thereof spaced along and supporting an irrigation line 12. Each tower assembly 10 includes wheels 14,16, which allow the irrigation line 12 to be moved across areas to be irrigated, as is well known. The tower assembly 10 includes a generally horizontal beam 18 which is disposed perpendicular to the irrigation line 12, and members 20,22 extending upwardly and inwardly of the ends of the beam 18 to support such irrigation line 12. It is to be understood that irrigation line 12 includes a plurality of lengths of pipe (not shown), which are bolted or otherwise connected to the lengths of pipe identified in FIGS. 1 and 2 by the numeral 12 and which are supported by the tower assembly 10.

An embodiment of the improved water motor 24 of the invention is depicted in FIGS. 1, 2 and 3.

Water motor 24 includes a water jet means 26 which is mounted to a shaft assembly 28, which shaft assembly is associated with housing 30 at one end thereof and with gear box 32 at the other end thereof. From gear box 32 rotational motion is transferred to wheels 14 and 16 through rotating shafts (not shown) which connect gear box 32 with wheels 14 and 16.

In FIG. 3, housing 30 include a mounting bracket 34, through which is disposed bolt 36 for securing said housing 30 to a flange 38, which has been secured to irrigation line 12. Housing 30 includes a first passage 40, and first and second ports 42 and 44 which communicate with first passage 40. An additional port 46 is provided substantially perpendicular to first passage 40, which additional port 46 is adapted to be connected to a pipe 48 (FIG. 2) which provides communication between the first passage 40 of housing 30 and the irrigation line 12. Housing 30 defines first and second annular grooves 50 and 52 which are located substantially adjacent first and second ports 42 and 44, respectively. Disposed in annular grooves 50 and 52 are seals 54 and 55, which in a preferred embodiment are V-shaped and comprised of an elastomeric material.

The above shaft assembly 28 of water motor 24 comprises a replaceable sleeve 56 which in a preferred embodiment can be comprised of stainless steel and which defines a second passage 58 and in a preferred embodiment a plurality of apertures 60, which provide communication between first passage 40 of housing 30 and the second passage 58. Sleeve 56 is disposed through first passage 40 and has ends 62 and 64 which extend out of ports 42 and 44, respectively. Seals 54 and 55 are located between replaceable sleeve 56 and housing 30 and can be slightly compressed therebetween. Initially, when water pressure is maintained in housing 30, the water pressure forces the portions of the V-shaped seals 54 and 55 apart and against the replaceable sleeve 56 of the housing 30 to ensure proper sealing. First and second ports 42 and 44 are in line and have axes which are colinear.

Shaft assembly 28 further includes a shaft 66 which includes end means 68 for fitting to the end 62 of sleeve 56. The end means 68 include a reduced diameter portion 70 which is received in the second passage 58 of the sleeve 56.

Water jet means 26 of water motor 24 includes water jets 72 and 74 which are repositionable so that the water jet means can spin clockwise and/or counterclockwise so as to drive the wheels 14 and 16 in one or the other direction. Water jets 72 and 74 extend from a central hub 76 which defines a third passage 78 which provides communication between second passage 58 and the water jets 72 and 74. Hub 76 includes means 80 for fitting said hub to the second end 64 of the sleeve 56. Essentially, said means 80 includes a portion 82 which extends into second passage 58. Extending through hub 76 is a bolt 84. Bolt 84 extends through third passage 78, through the second passage 58 of sleeve 56 and is received in a threaded bore 86 which is defined by portion 70 of the shaft 66. Bolt 84 secures water jet means 26 to shaft 66 with replaceable sleeve 56 held securely therebetween.

Shaft 66 is welded in a preferred embodiment to a smaller diameter drive shaft 88 which is associated with gear box 32.

The operation of the water motor 24 is as follows. With water entering the line 12, the water proceeds through tube 48 to the first passage 40 of housing 30. The water proceeds through apertures 60 into the second passage 58 defined by the sleeve 56 to third passage 78 of the water motor means and therefrom to the water jets 72 and 74. The water coming from water jets 72 and 74 causes the water jet means 26 to spin either clockwise or counterclockwise depending on the direction of said jets, and thus causes the shaft assembly 28 including drive shaft 88 to spin, driving the gear box 32 and in turn the wheels 14 and 16 to move the irrigation line 12 across the field.

Should sand or other abrasives be carried along with the water, and should these abrasives abrade the sleeve 56, especially in the areas of seals 54 and 55, the sleeve 56 can be easily replaced by removing bolt 84 and water jet means 26, and then by removing sleeve 56. Sleeve 56 can be easily replaced with a new sleeve and the water jet means 26 and the bolt 84 easily replaced to place the water motor 24 back in an operational condition. It should be appreciated that with such an arrangement the replaceable sleeve 56 can be comprised of in a preferred embodiment stainless steel, as indicated above, whereas the remainder of the shaft assembly 28 can be comprised of a less abrasive-resistant material, as for example, aluminum. With prior art devices, the wearing away of the shaft would require the complete replacement of the drive shaft, which would obviously be more costly and involve more time than the replacement of a replaceable sleeve, as contemplated by the present invention.

Other aspects, objects and advantages of this invention can be obtained from a study of the drawings, the disclosure, and the appended claims.

I claim:

1. A water motor comprising:
   a housing defining a first passage with first and second ports, said housing adapted to connect with a source of water;
   a replaceable sleeve defining a second passage, said sleeve disposed in said first passage and having at least one aperture providing communication between said first passage and said second passage, said sleeve having a first end located substantially adjacent said first port and a second end located substantially adjacent said second port, which second end communicates with said second passage;
   a shaft;
   means for fitting said shaft to said first end;
   water jet means for dispensing water to cause said shaft to revolve;
   means for fitting said water jet means to said second end so that said water jet means communicates with said second passage; and
   means for removably securing said water jet means to said shaft.

2. The water motor of claim 1 including:
   first seal means located adjacent said first port and disposed between said sleeve and said housing; and
   second seal means located adjacent said second port and disposed between said sleeve and said housing.

3. The water motor of claim 1 wherein said means for fitting said shaft to said first end includes a portion extending from said shaft into said second passage.

4. The water motor of claim 1 wherein said means for fitting said water jet means to said second end includes a portion extending from said water jet means into said second passage.

5. The water motor of claim 1 wherein said securing means includes an elongated bolt extending at least partially through said water jet means, through said sleeve and into an accommodating bore defined by said shaft.

6. The water motor of claim 1 wherein said water jet means includes first and second jets which extend from a central hub; and
   wherein said hub defines a third passage which communicates with said jets and said second passage of said sleeve.

7. The water motor of claim 1 wherein said sleeve is cylindrical.

8. An irrigation system including:
   an irrigation line;
   at least one tower assembly having at least one ground engaging wheel;
   a water motor having:
   a housing defining a first passage with first, second and third ports;
   means for communicating said irrigation line with said third port;
   a replaceable sleeve defining a second passage, said sleeve disposed in said first passage and having at least one aperture providing communication between said first passage and said second passage, said sleeve having a first end located substantially adjacent said first port and a second end located substantially adjacent said second port, which second end communicates with said second passage;

a shaft;

means for fitting said shaft to said first end;

water jet means for dispensing water to cause said shaft to revolve;

means for fitting said water jet means to said second end so that said water jet means communicates with said second passage; and means for removably securing said water jet means to said shaft.

9. The water motor of claim 8 wherein said means for fitting said shaft to said first end includes a portion extending from said shaft into said second passage and said water jet means has a portion which extends into said second passage.

10. The water motor of claim 8 wherein said means for fitting said water jet means to said second end includes a portion extending from said water jet means into said second passage.

11. The water motor of claim 1 wherein said securing means includes an elongated bolt at least partially extending through said water jet means, through said sleeve and into an accommodating bore defined by said shaft.

* * * * *